United States Patent [19]
Ukita

[11] Patent Number: 5,995,174
[45] Date of Patent: Nov. 30, 1999

[54] LIQUID CRYSTAL DISPLAY APPARATUS WITH SOURCE/DRAIN ELECTRODES AND PIXEL ELECTRODE FORMED BY THE SAME MATERIAL

[75] Inventor: Tooru Ukita, Tokyo, Japan

[73] Assignee: NEC Corporation, Tokyo, Japan

[21] Appl. No.: 08/883,432

[22] Filed: Jun. 26, 1997

[30] Foreign Application Priority Data

Jun. 27, 1996 [JP] Japan ................................. 8-167756

[51] Int. Cl.$^6$ ....................................................... G02F 1/136
[52] U.S. Cl. .............................. 349/43; 349/139; 257/59; 257/72
[58] Field of Search .............................. 349/42, 43, 139; 257/59, 72

[56] References Cited

U.S. PATENT DOCUMENTS 5,886,757  3/1999  Song et al. .

FOREIGN PATENT DOCUMENTS 2-208636  8/1990  Japan .
5-188397  7/1993  Japan .

*Primary Examiner*—Robert H. Kim
*Attorney, Agent, or Firm*—Whitham, Curtis & Whitham

[57] ABSTRACT

In a liquid crystal display apparatus including a gate electrode formed on an insulating layer a gate insulating layer formed on the gate electrode, and a semiconductor active layer formed on the gate insulating layer, a source electrode and a drain electrode are formed on the semiconductor active layer, and have a double structure including a first conductive layer and a second conductive layer formed on the first conductive layer. Also, a pixel electrode is formed on an insulating layer and is connected to the second conductive layer of the drain electrode via a contact hole perforated in the insulating layer. The pixel electrode is made of the same material as that of the second conductive layer.

12 Claims, 17 Drawing Sheets

LIQUID CRYSTAL DISPLAY APPARATUS WITH SOURCE/DRAIN ELECTRODES AND PIXEL ELECTRODE FORMED BY THE SAME MATERIAL

BACKGROUND OF THE INVENTION

1. Field of the Invention

The present invention relates to a method for manufacturing a liquid crystal display (LCD) apparatus, and more particularly, an improvement of the drain/source electrodes of a thin film transistor (TFT).

2. Description of the Related Art

Active matrix-type LCD apparatuses are so thin and light that they are often used in various display apparatuses. Also, since the active matrix-type LCD apparatuses can be of a large size and fine screen with a high quality and a low power dissipation, cathode ray tubes (CRTs) have been replaced with the active matrix-type LCD apparatuses.

In an active matrix-type LCD apparatus, one TFT is provided as a switching element for each pixel. The TFT is constructed by a gate electrode, a semiconductor active layer made of amorphous silicon opposing the gate electrode, a source electrode, and a drain electrode connected to a transparent pixel electrode. Also, the gate electrode is connected to one gate bus line, and the source electrode is connected to one source bus line.

In a first prior art LCD apparatus, the source bus line and the transparent pixel electrode are formed on the same surface of a gate insulating layer. This will be explained later in detail.

In the first prior art LCD apparatus, however, since the space between the source bus line and the transparent pixel electrode needs to be 10 μm or more, in order to avoid a short-circuit, the numerical aperture is reduced.

In a second prior art LCD apparatus (see JP-A-2-208636), the source bus line is formed on the gate insulating layer, while the transparent pixel electrode is formed on another insulating layer. In this case, the transparent pixel electrode is connected via a contact hole perforated in the insulating layer to the drain electrode. Therefore, since the source bus line is electrically isolated from the transparent pixel electrode by the insulating layer, the space between the source bus line and the transparent pixel electrode can be reduced to thereby increase the numerical aperture. This will be also explained later in detail.

In the second prior art LCD apparatus, however, a resistance between the transparent pixel electrode and the drain electrode becomes unstable which deteriorates the characteristics of the TFT. A dry etching process as well as the formation of a photoresist pattern for forming the contact hole invites the contamination of the surface of the drain electrode. Further, if the transparent pixel electrode is formed by a sputtering process, the surface of the drain electrode is also in an oxidation state. In addition, the surface of the drain electrode is oxidized by oxygen included in the transparent pixel electrode.

In a third prior art LCD apparatus (see JP-A-5-188397), in order to obtain good coverage characteristics of the transparent pixel electrode to the drain electrode without a dry etching process, a wet etching process is carried out twice to form a contact hole in the insulating layer between the transparent pixel electrode and the drain electrode.

The double wet etching processes prevent the surface of the drain electrode from being contaminated, so that the resistance between the transparent pixel electrode and the drain electrode becomes stable. This will be explained later in detail.

In the third prior art LCD apparatus, however, it is impossible to completely avoid the disconnection of the transparent pixel electrode around the edges of the contact hole. In addition, the double wet etching processes associated with two photolithography processes increase the manufacturing cost and reduce the manufacturing yield.

In a fourth prior art LCD apparatus, after the above-mentioned contact hole is formed, a sputter-etching process is performed upon the drain electrode to remove the contamination of the surface thereof. Then, the transparent pixel electrode is formed.

In the fourth prior art LCD apparatus, however, even during a step for depositing the transparent pixel electrode, the surface of the drain electrode is oxidized. In addition, a large scale sputter-etching apparatus is required which increases the manufacturing cost.

SUMMARY OF THE INVENTION

It is an object of the present invention to reduce the resistance between a pixel electrode and a drain electrode in an LCD apparatus where the pixel electrode is formed above the drain electrode and is connected via a contact hole in an insulating layer to the drain electrode.

Another object is to avoid the disconnection of the pixel electrode around the contact hole.

According to the present invention, in an LCD apparatus including a gate electrode formed on an insulating layer a gate insulating layer formed on the gate electrode, and a semiconductor active layer formed on the gate insulating layer, a source electrode and a drain electrode are formed on the semiconductor active layer, and have a double structure including a first conductive layer and a second conductive layer formed on the first conductive layer. Also, a pixel electrode is formed on an insulating layer and is connected to the second conductive layer of the drain electrode via a contact hole perforated in the insulating layer. The pixel electrode is made of the same material as that of the second conductive layer.

Since the material of the pixel electrode is the same as that of the second conductive layer of the drain electrode, the resistance therebetween becomes stable. In addition, if the contact hole is formed by a dry etching process, the coverage characteristics of the pixel electrode can be improved, so that the disconnection of the pixel electrode around the contact hole can be avoided.

BRIEF DESCRIPTION OF THE DRAWINGS

The present invention will be more clearly understood from the description as set forth below, with reference to the accompanying drawings, wherein.

DESCRIPTION OF THE PREFERRED EMBODIMENTS

Before the description of the preferred embodiments, prior art LCD apparatuses will be explained with reference to FIGS. 1 through 10.

Figure 1:
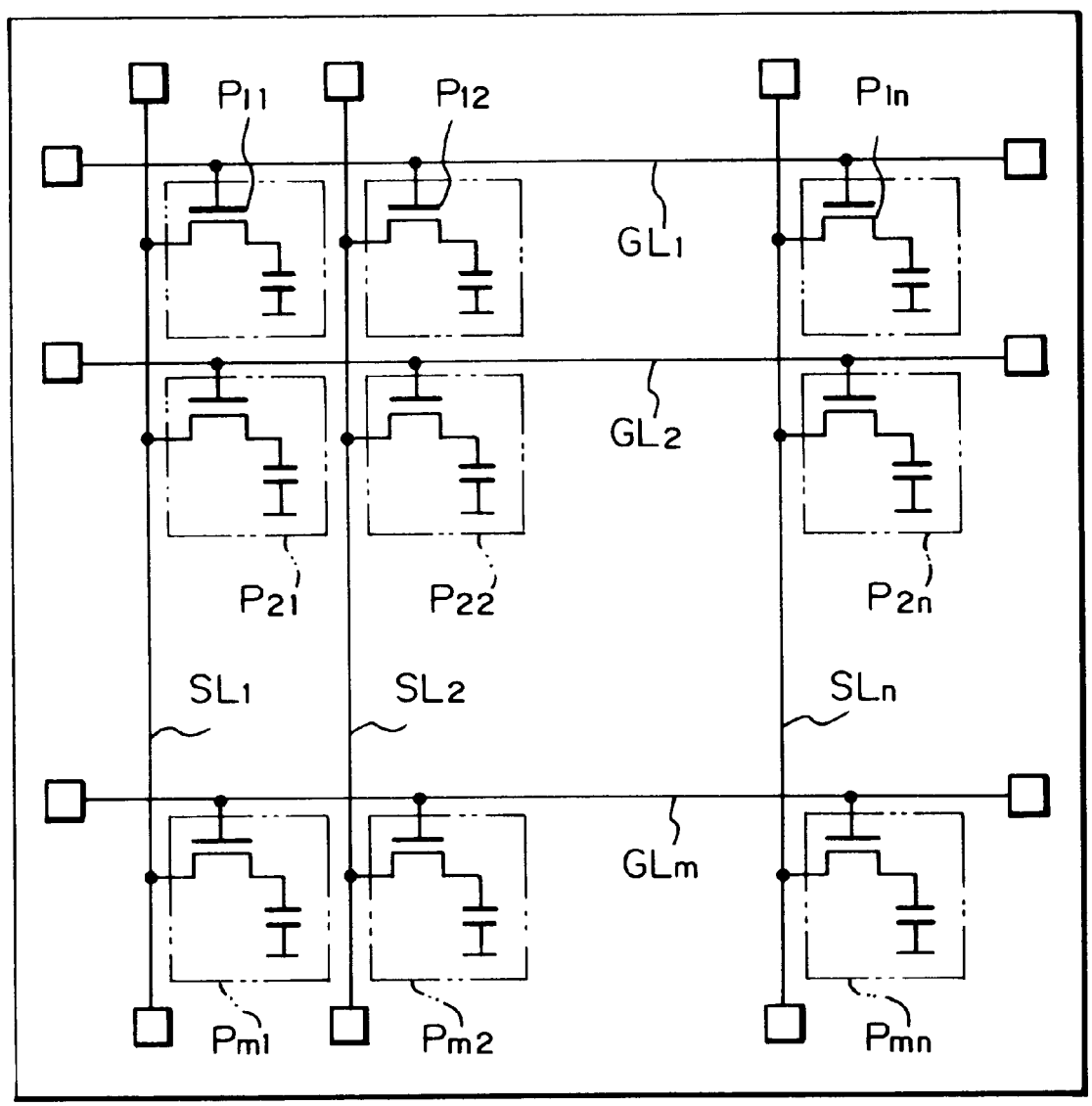
FIG. 1 is a circuit diagram illustrating a general active matrix-type LCD apparatus.

In FIG. 1, which illustrates a general active matrix-type LCD apparatus, references $GL_1, GL_2, \ldots, GL_m$ designate scan bus lines (gate bus lines), and $SL_1, SL_2, \ldots, SL_m$ designate signal bus lines (source bus lines). A plurality of pixels $P_{11}, P_{12}, \ldots, P_{mn}$ are provided at intersections between the gate bus lines $GL_1, GL_2, \ldots, GL_m$ and the source bus lines $SL_1, SL_2, \ldots, SL_n$.

Figure 2:
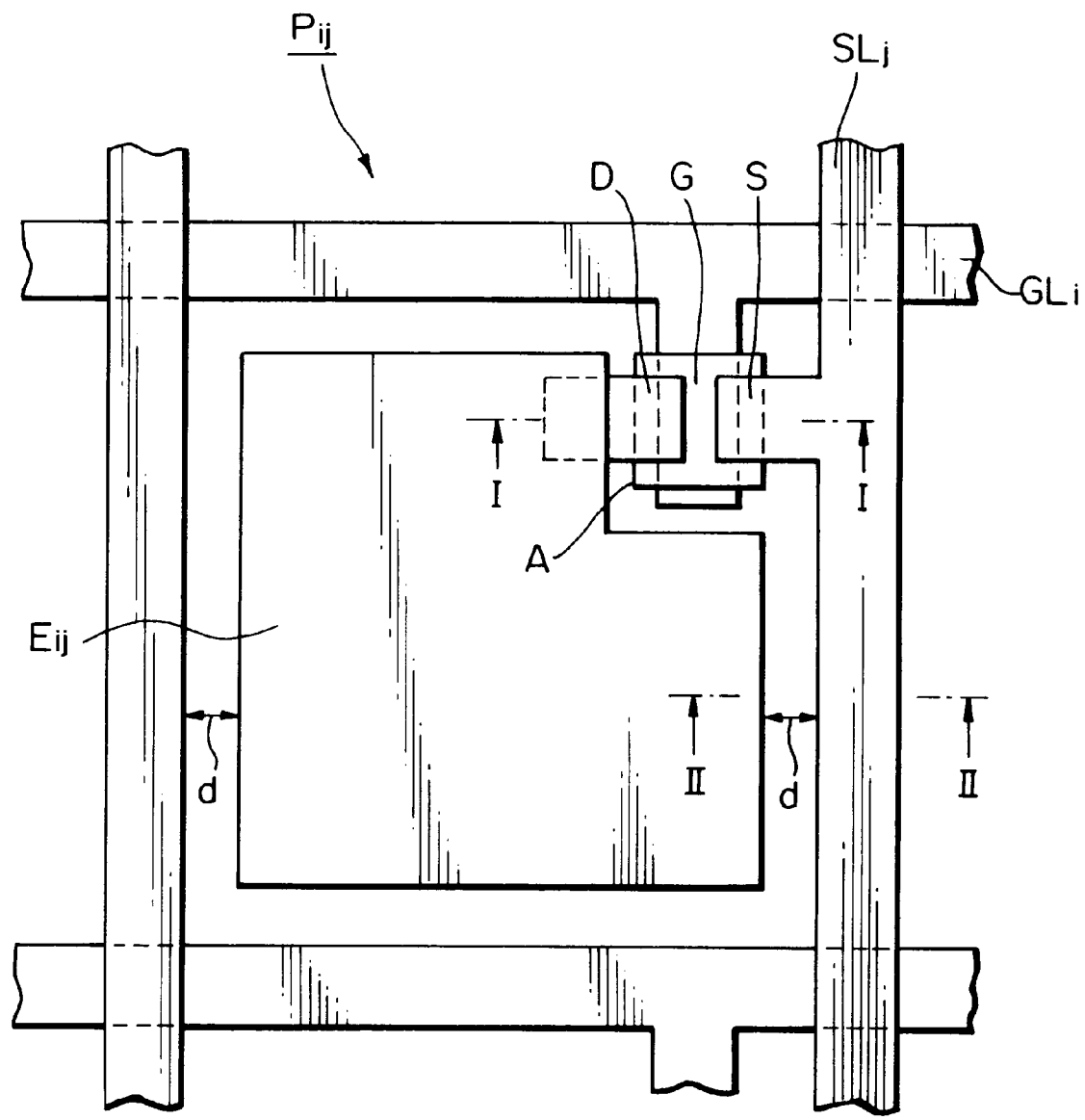
FIG. 2 is a plan view illustrating a first prior art LCD apparatus.
Figure 3:
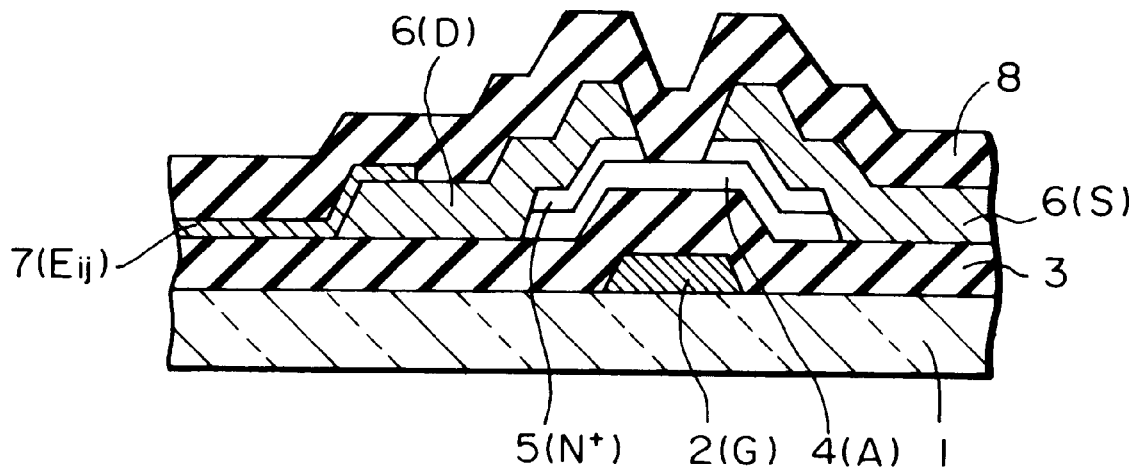
FIGS. 3 and 4 are cross-sectional views taken along the lines I—I and II—II, respectively, of FIG. 2.
Figure 4:
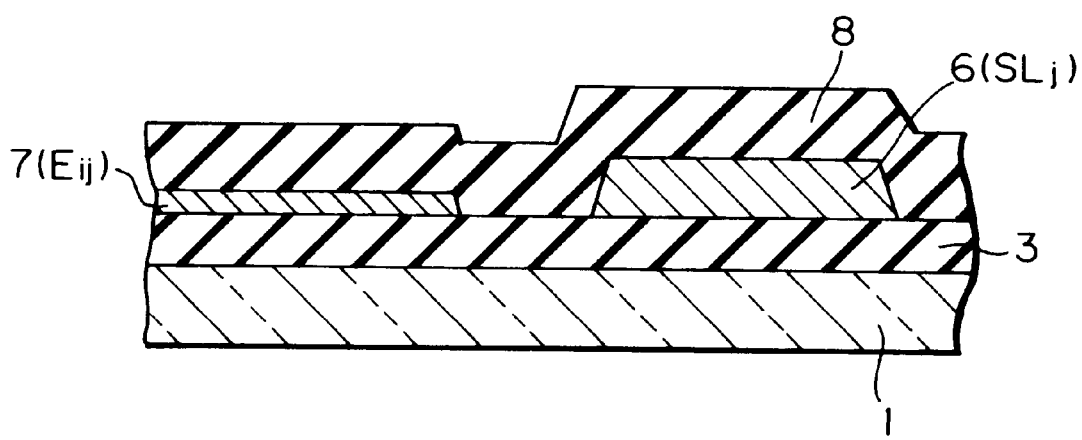

FIG. 2 is a plan view illustrating a first prior art LCD apparatus, and FIGS. 3 and 4 are cross-sectional views taken along the lines I—I and II—II, respectively, of FIG. 2.

In FIG. 2, which is also an enlargement of one pixel $P_{ij}$ of FIG. 1, the pixel $P_{ij}$ is constructed by a thin film transistor (TFT) $Q_{ij}$ and a transparent pixel electrode $E_{ij}$. The TFT $Q_{ij}$ is formed by a gate electrode G shunted from the gate bus line $GL_i$, a semiconductor active layer A made of amorphous silicon opposing the gate electrode G, a source electrode S shunted from the source bus line $SL_j$, and a drain electrode D connected to the transparent pixel electrode $E_{ij}$. One end of the semiconductor active layer A is connected to the drain electrode D, and the other end of the semiconductor active layer A is connected to the source electrode S.

As illustrated in FIGS. 3 and 4, the TFT $Q_{ij}$ is of an inverted staggered type where the gate electrode G is beneath the semiconductor active layer A, and also, the TFT $Q_{ij}$ is of a channel etching type. That is, a conductive layer 2 is deposited on a glass substrate 1. The conductive layer 2 is patterned, so that the gate electrode G and the gate bus line $GL_i$ (not shown) are formed. Also, a gate insulating layer 3 made of silicon nitride is deposited on the entire surface. Further, a non-doped amorphous silicon layer 4 is deposited, and an $N^+$-type amorphous silicon layer 5 is deposited on the non-doped amorphous silicon layer 4. Further, a conductive layer 6 is deposited on the entire surface. The conductive layer 6 is patterned, so that the source bus line $SL_j$, the source electrode S and the drain electrode D are formed. Also, the amorphous silicon layer 4 asociated with the $N^+$-type amorphous silicon layer 5 is etched by using the patterned conductive layer 6 as a mask, so that the semiconductor active layer A of an island shape is formed and opposes the gate electrode G. In this case, note that a channel portion of the semiconductor active layer A is partly etched.

Further, an indium tin oxide (ITO) layer 7 is deposited by a sputtering process, and is patterned to form the transparent pixel electrode $E_{ij}$. In addition, an insulating layer 8 made of silicon nitride is formed on the entire surface.

In the LCD apparatus of FIGS. 2, 3 and 4, however, since the source bus line $6(SL_j)$ and the transparent pixel electrode $7(E_{ij})$ are formed on the same surface of the gate insulating layer 3, a space d therebetween needs to be 10 $\mu$m or more, in order to avoid a short-circuit therebetween. As a result, the numerical aperture is reduced.

Figure 5:
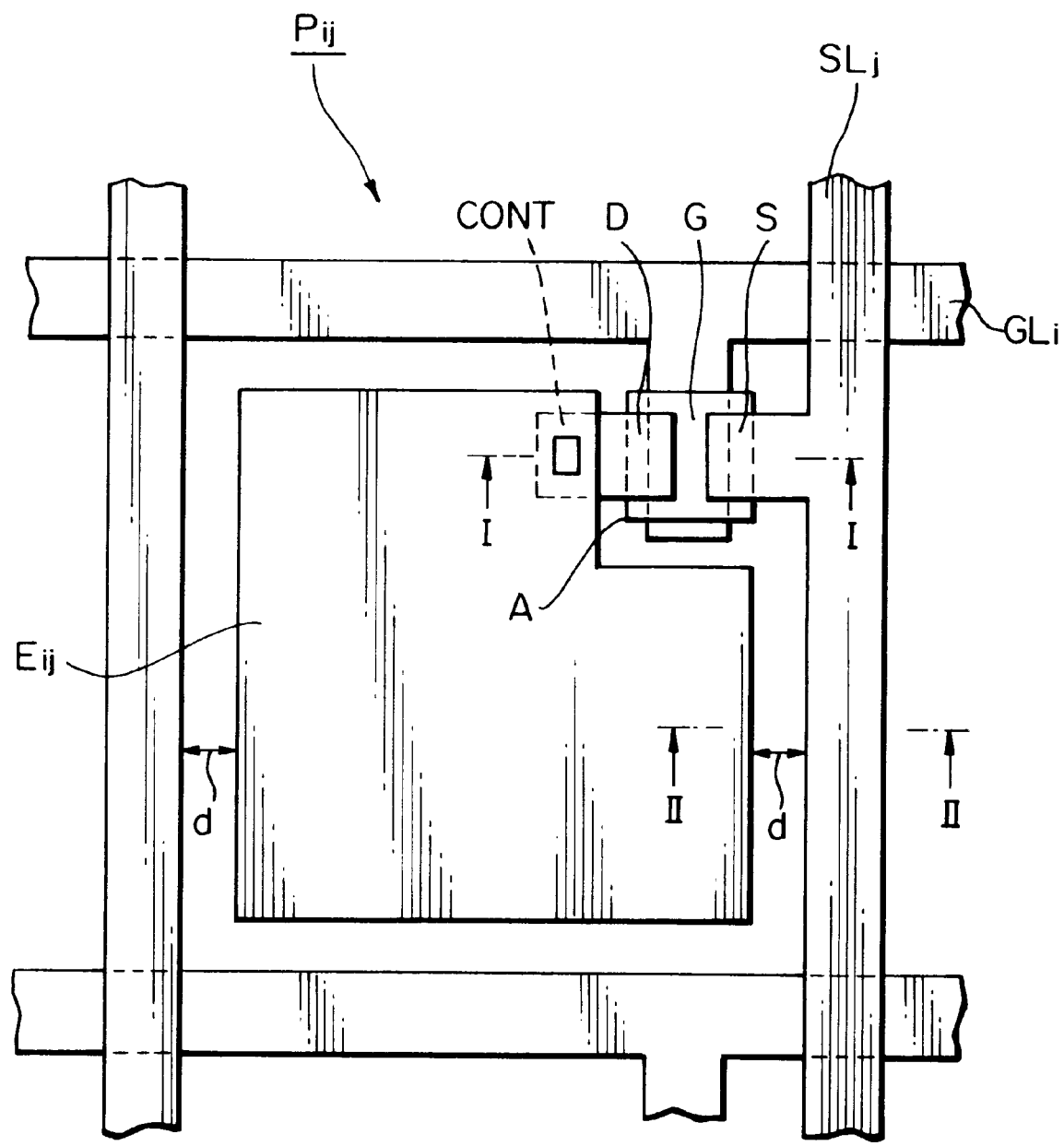
FIG. 5 is a plan view illustrating a second prior art LCD apparatus.
Figure 6:
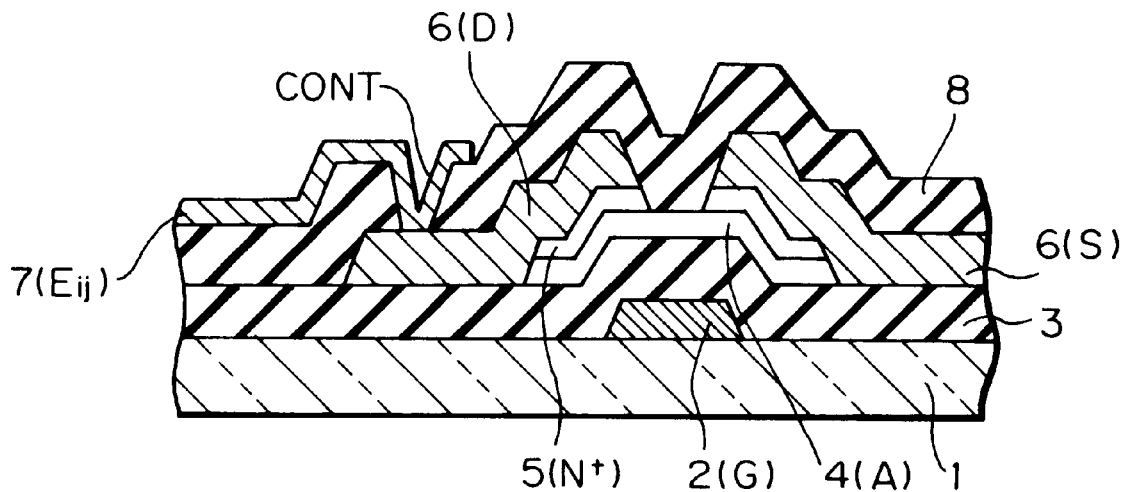
FIGS. 6 and 7 are cross-sectional views taken along the lines I—I and II—II, respectively, of FIG. 5.
Figure 7:
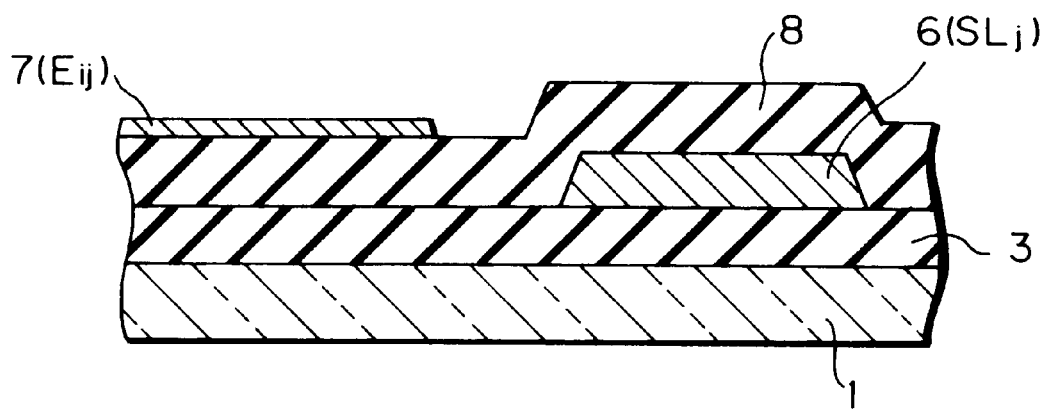

FIG. 5 is a plan view illustrating a second prior art LCD apparatus (see JP-A-2-208636), and FIGS. 6 and 7 are cross-sectional views taken along the lines I—I and II—II, respectively, of FIG. 5.

In FIGS. 5, 6 and 7, the source bus line 6 ($SL_j$) is formed on the gate insulating layer 3, while the transparent pixel electrode $7(E_{ij})$ is formed on the insulating layer 8. In this case, the transparent pixel electrode $E_{ij}$ is connected via a contact hole CONT to the drain electrode 6(D). Therefore, since the source bus line $SL_j$ is electrically isolated from the transparent pixel electrode $E_{ij}$ by the insulating layer 8, the space d between the source bus line $SL_j$ and the transparent pixel electrode $E_{ij}$ can be reduced to thereby increase the numerical aperture.

In the LCD apparatus of FIGS. 5, 6 and 7, however, a resistance between the transparent pixel electrode $7(E_{ij})$ and the drain electrode 6(D) becomes unstable which deteriorates the characteristics of the TFT $Q_{ij}$. That is, when the silicon nitride of the insulating layer 8 is formed by a plasma chemical vapor deposition (CVD) process at a high temperature such as 300° C., the surface of the drain gate 6(D) is in an oxidation state. Also, in view of the good tapered configuration of the contact hole CONT to obtain good coverage characteristics of the transparent pixel electrode $7(E_{ij})$ to the drain electrode $7(E_{ij})$, a dry etching process rather than a wet etching process is performed upon the insulating layer 8 to form the contact hole CONT therein. However, this dry etching process invites the contamination of the surface of the drain electrode 6(D) since a photoresist pattern is sputter-etched so that photoresist may be adhered to the surface of the drain electrode 6(D). Further, if the transparent pixel electrode $E_{ij}$ is formed by a sputtering process, the surface of the drain electrode 6(D) is also in an oxidation state. In addition, the surface of the drain electrode 6(D) is oxidized by oxygen included in the transparent pixel electrode $7(E_{ij})$.

Figure 8:
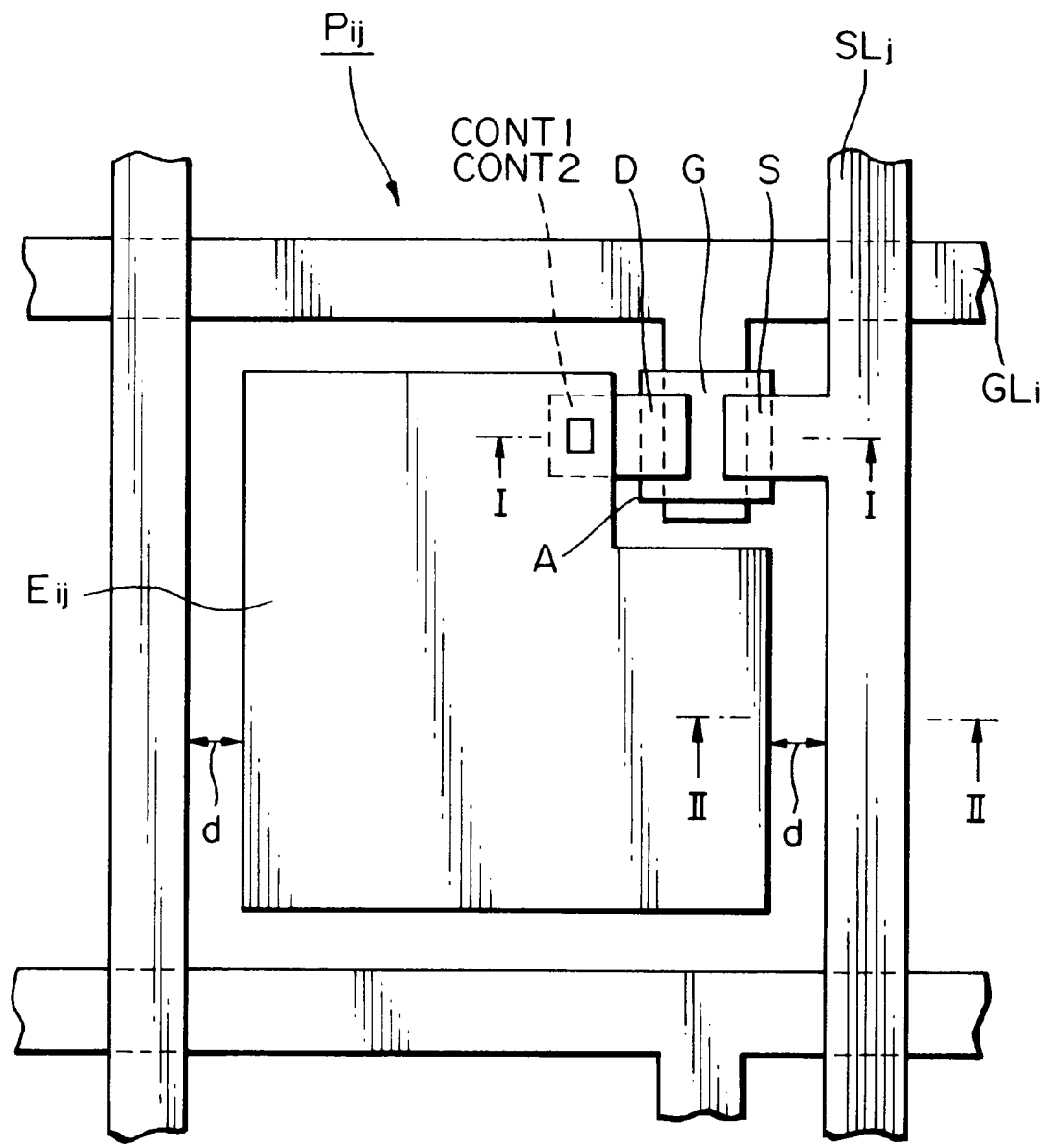
FIG. 8 is a plan view illustrating a third prior art LCD apparatus.
Figure 9:
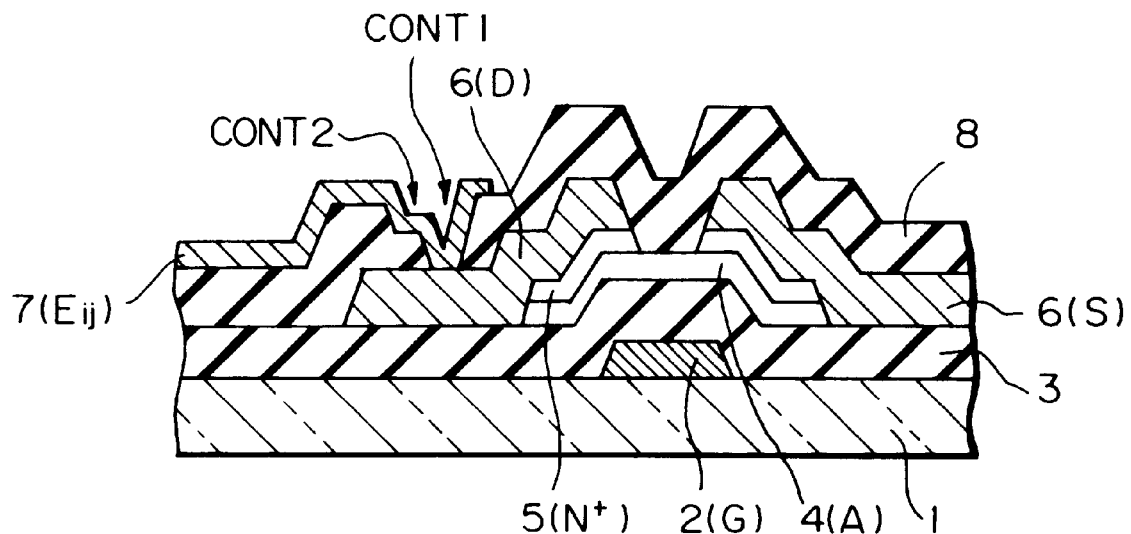
FIGS. 9 and 10 are cross-sectional views taken along the lines I—I and II—II, respectively, of FIG. 8.
Figure 10:
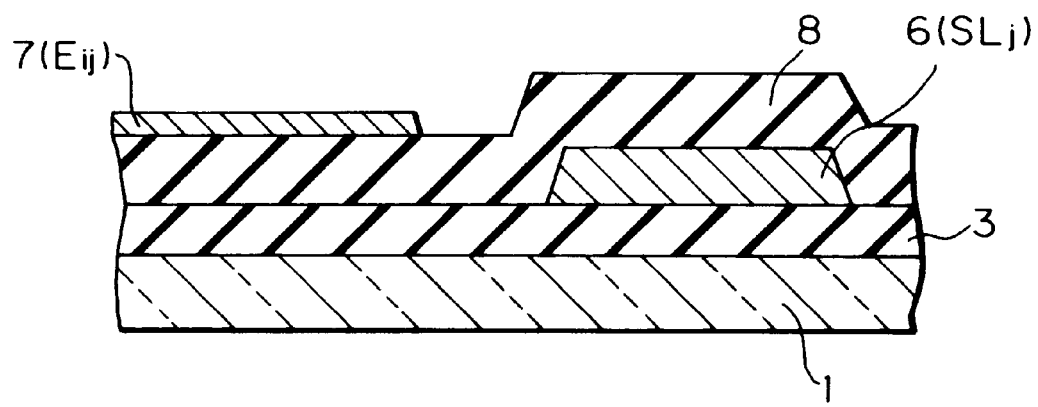

FIG. 8 is a plan view illustrating a third prior art LCD apparatus (see JP-A-5-188397), and FIGS. 9 and 10 are cross-sectional views taken along the lines I—I and II—II, respectively, of FIG. 8.

In FIGS. 8, 9 and 10, in order to obtain the good coverage characteristics of the transparent pixel electrode $6(E_{ij})$ to the drain electrode 6(D) without a dry etching process, a first wet etching process is performed upon the insulating layer 8 to form a contact hole CONT1, and thereafter, a second wet etching process is performed upon the insulating layer 8 to form a contact hole CONT2. Thus, the wet etching processes prevent the surface of the drain electrode 6(D) from being contaminated, so that the resistance between the transparent pixel electrode $7(E_{ij})$ and the drain electrode 6(D) becomes stable.

In the LCD apparatus of FIGS. 8, 9 and 10, if the insulating layer 8 is made of silicon nitride which is 200 nm or more in thickness and the transparent pixel electrode $7(E_{ij})$ is made of ITO which is 50 nm or less in thickness, it is impossible to completely avoid the disconnection of the transparent pixel electrode $7(E_{ij})$ around the edges of the contact holes CONT1 and CONT2. In addition, the two wet etching processes are associated with two photolithography processes, which increases the manufacturing cost and reduces the manufacturing yield.

Figure 11:
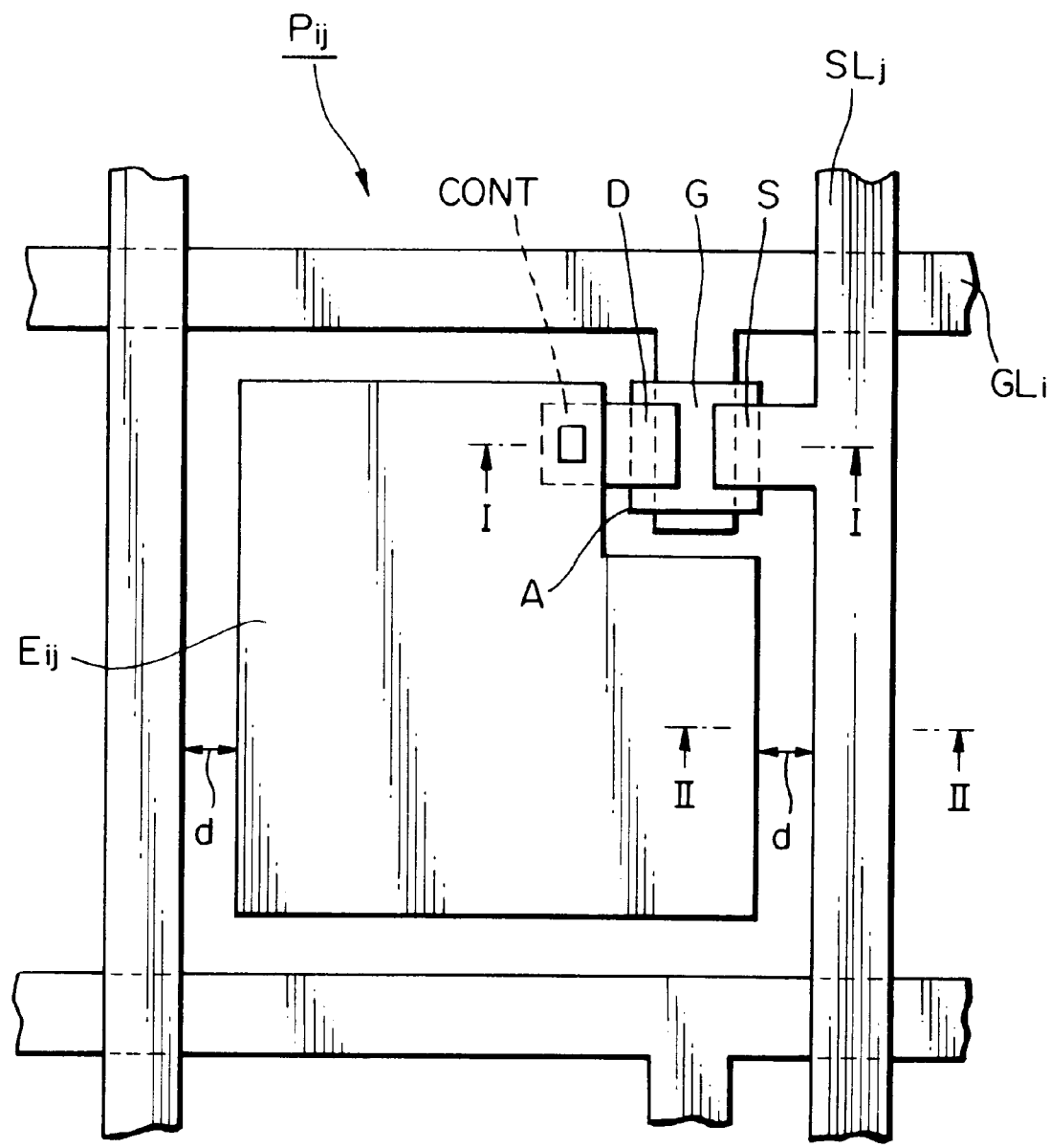
FIG. 11 is a plan view illustrating a first embodiment of the LCD apparatus according to the present invention.
Figure 12:
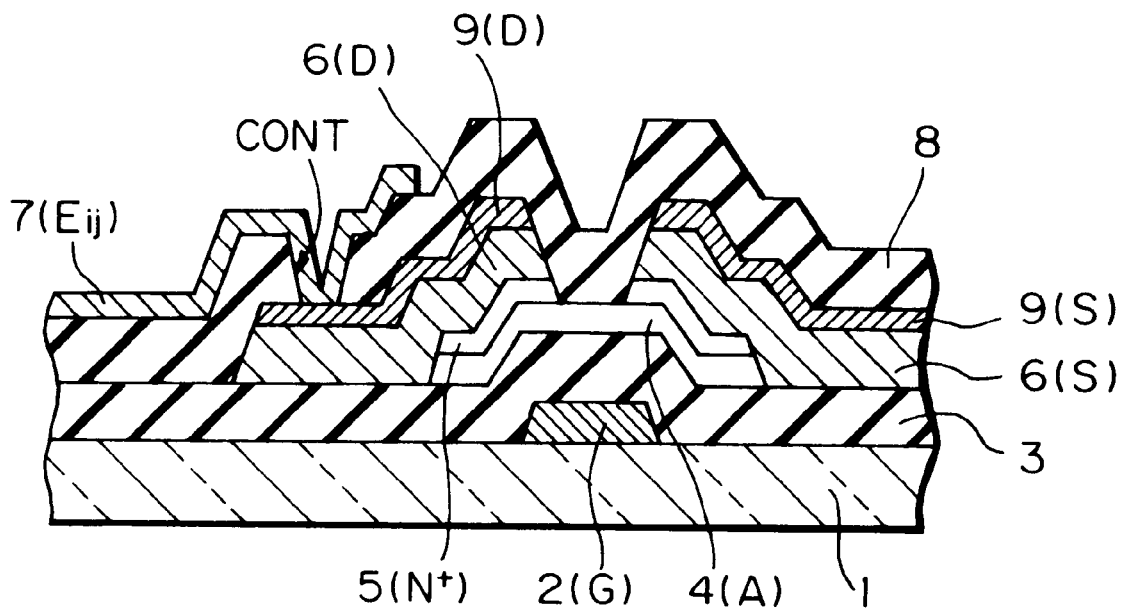
FIGS. 12 and 13 are cross-sectional views taken along the lines I—I and II—II, respectively, of FIG. 11.
Figure 13:
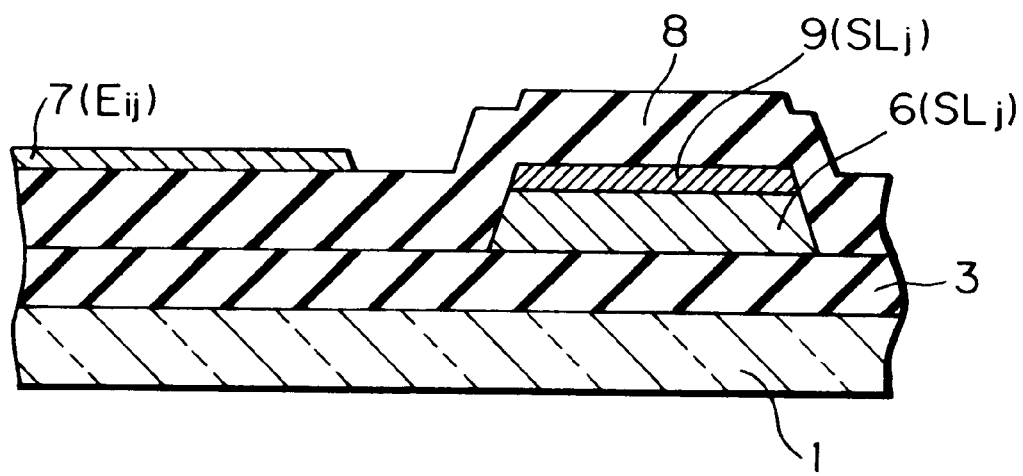

FIG. 11 is a plan view illustrating a first embodiment of the LCD apparatus according to the present invention, and FIGS. 12 and 13 are cross-sectional views taken along the lines I—I and II—II, respectively, of FIG. 11.

In FIGS. 11, 12 and 13, a conductive layer 9 is formed on the conductive layer 6. In this case, the conductive layer 9 is made of the same material as that of the transparent pixel electrode 7($E_{ij}$) which is, in this case, ITO. That is, the source electrode S, the drain electrode D and the source bus line $SL_j$ are of a double configuration of ITO/metal. The conductive layers 6 and 9 can be sequentially formed, so that the surface of the conductive layer 6 becomes stable. In addition, the contact area between the conductive layers 6 and 9 is large. Therefore, a resistance between the conductive layers 6 and 9 becomes stable and low. Further, the conductive layer (ITO) 9 is not subjected to oxidation by a plasma CVD process for forming the insulating layer 8 and contamination by a dry etching process for forming the contact hole CONT. In addition, the connection between the conductive layer 9 and the transparent pixel electrode 7($E_{ij}$) is stable, since they are made of the same material.

The manufacturing steps of the apparatus of FIGS. 11, 12 and 13 are explained next with reference to FIGS. 14A through 14F.

Figure 14A:
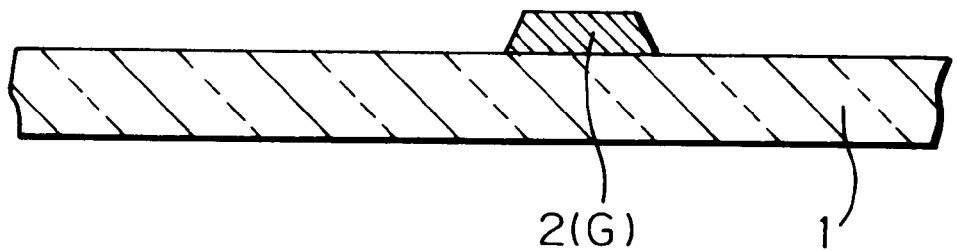
FIGS. 14A through 14F are cross-sectional views for explaining the manufacturing steps of the apparatus of FIG. 12.

First, referring to FIG. 14A, an about 100 to 300 nm thick conductive layer 2 made of Cr, Mo or Ta is deposited by a sputtering process on a glass substrate 1. Then, the conductive layer 2 is patterned by a photolithography process to form a gate electrode G and a gate bus line $GL_i$ (see FIG. 11).

Figure 14B:
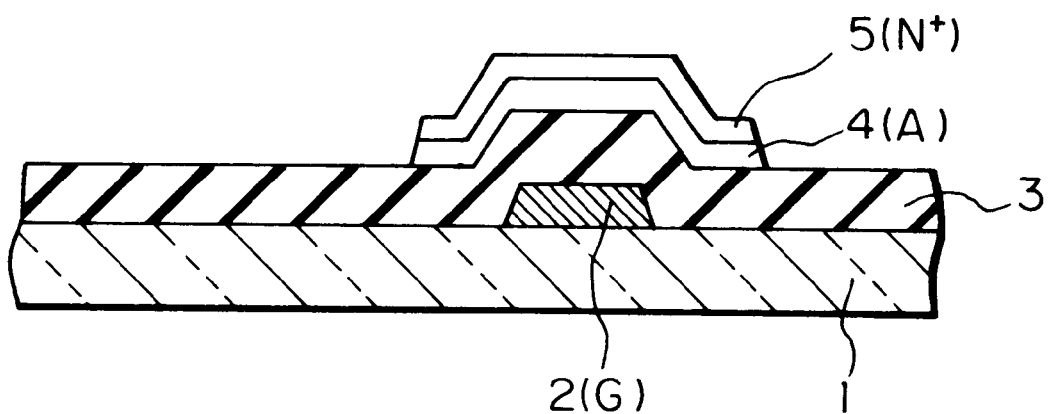

Next, referring to FIG. 14B, an about 200 to 600 nm thick gate insulating layer 3 made of silicon nitride is deposited by a plasma CVD process using silane and ammonia gas. Subsequently, an about 50 to 300 nm thick non-doped amorphous silicon layer 4 is deposited by a plasma CVD process using silane gas, and subsequently, an about 30 to 100 nm thick $N^+$-type amorphous silicon layer 5 is deposited by a plasma CVD process using silane and phosphine gas. The $N^+$-type amorphous silicon layer 5 and the non-doped amorphous silicon layer 4 are patterned by a photolithography process, so that an island shape is formed.

Figure 14C:
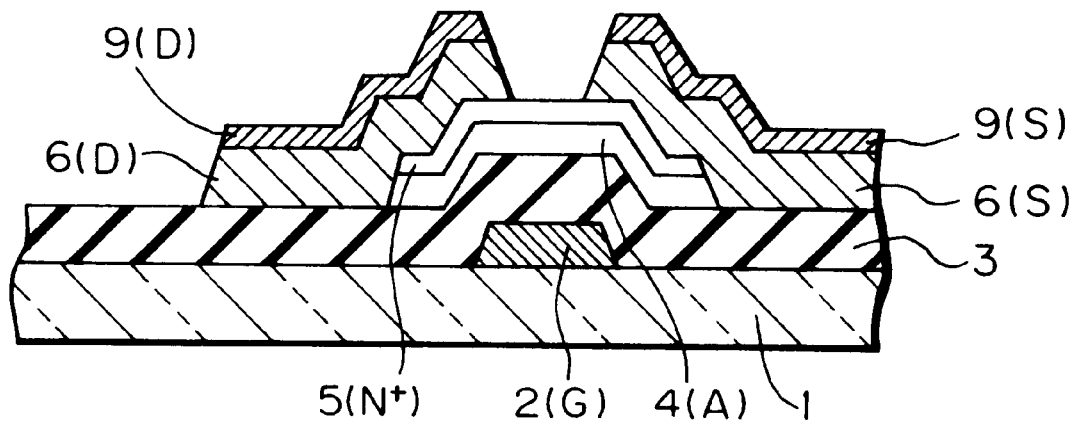

Next, referring to FIG. 14C, an about 100 to 300 nm thick conductive layer 6 made of Cr, Mo or Ta is deposited by a sputtering process, and subsequently, an about 10 to 100 nm thick conductive layer 9 made of ITO is deposited by a sputtering process. Then, the conductive layers 9 and 6 are patterned by a photolithography process to form a source electrode S, a drain electrode D and a source bus line $SL_j$ (see FIG. 13).

Figure 14D:
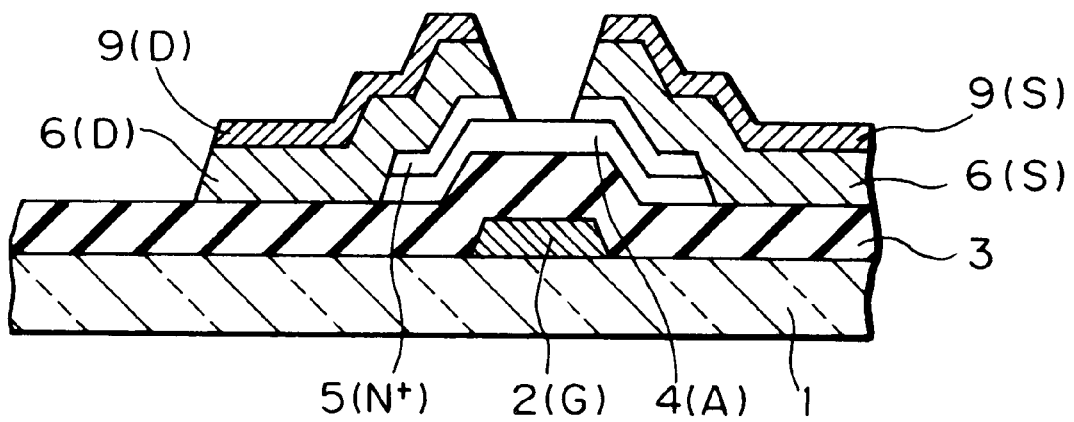

Next, referring to FIG. 14D, the $N^+$-type amorphous silicon layer 5 is etched by a dry etching process using the source electrode S and the drain electrode D as a mask, so that the source electrode S is electrically isolated from the drain electrode D. In this case, the amorphous silicon layer 4 is slightly etched.

Figure 14E:
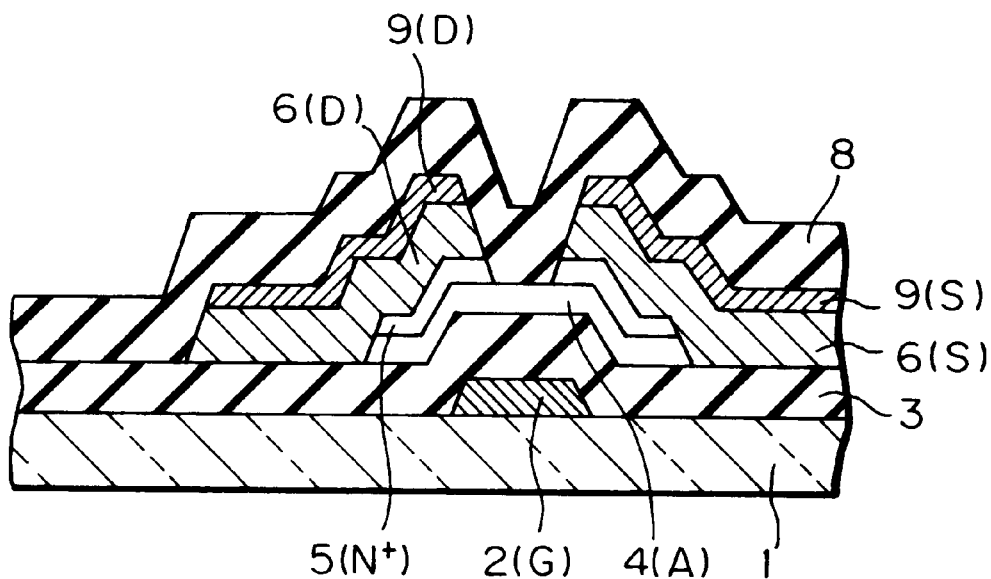

Next, referring to FIG. 14E, an about 200 to 400 nm thick insulating layer 8 made silicon nitride is deposited by a plasma CVD process. Note that the insulating layer 8 can be formed by coating and baking organic material such as polyimide.

Figure 14F:
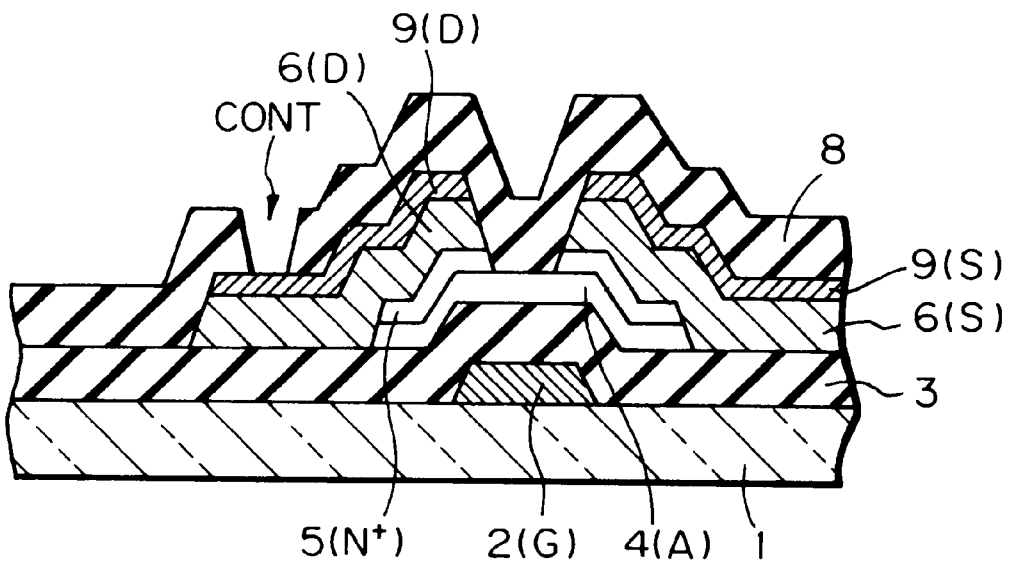

Next, referring to FIG. 14F, an 8 μm×8 μm contact hole CONT is perforated in the insulating layer 8 above the drain electrode D by a reactive ion (dry) etching process using $SF_6$ gas. Note that, if the insulating layer 8 is made of polyimide, the insulating layer 8 is etched by a reactive ion etching process using a mixture gas of $CF_4$ and $O_2$.

Finally, an about 10 to 100 nm thick ITO layer is deposited by a sputtering process, and is patterned by a photolithography process to form a transparent pixel electrode $E_{ij}$, as illustrated in FIG. 12.

According to the inventor's experiment, in the first embodiment, the resistance between the transparent pixel electrode $E_{ij}$ and the drain electrode D was 100 to 500 Ω, while in the second prior art, the resistance between the transparent pixel electrode $E_{ij}$ and the drain electrode D was 100 Ω to 20 MΩ. That is, such resistance in the first embodiment can be made small both in absolute value and deviation.

In addition, since the contact hole CONT is formed by a dry etching process, a taper angle of the contact hole CONT can be about 45°, so that the coverage characteristics of the transparent pixel electrode $E_{ij}$ can be improved.

Figure 15:
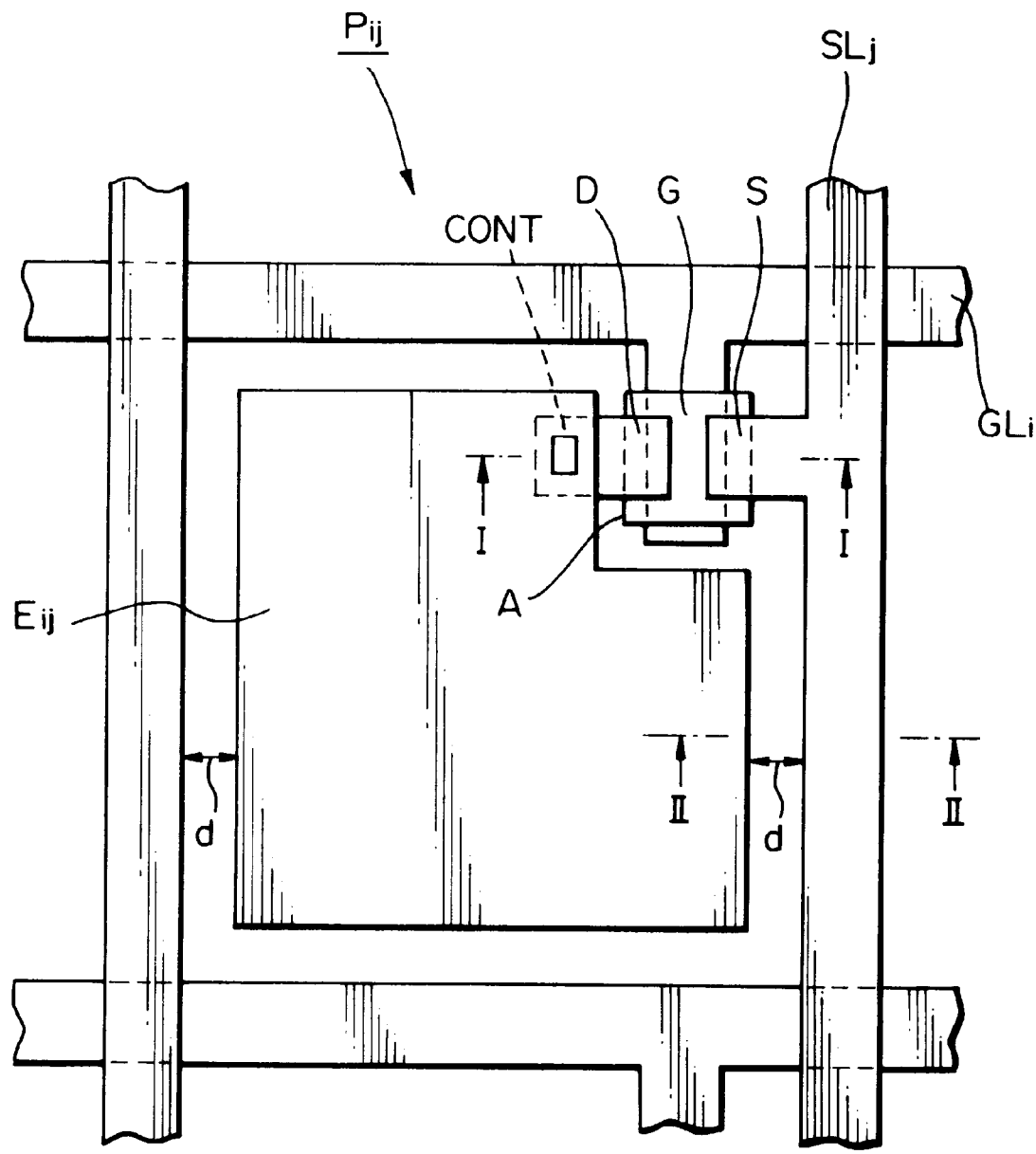
FIG. 15 is a plan view illustrating a second embodiment of the LCD apparatus according to the present invention.
Figure 16:
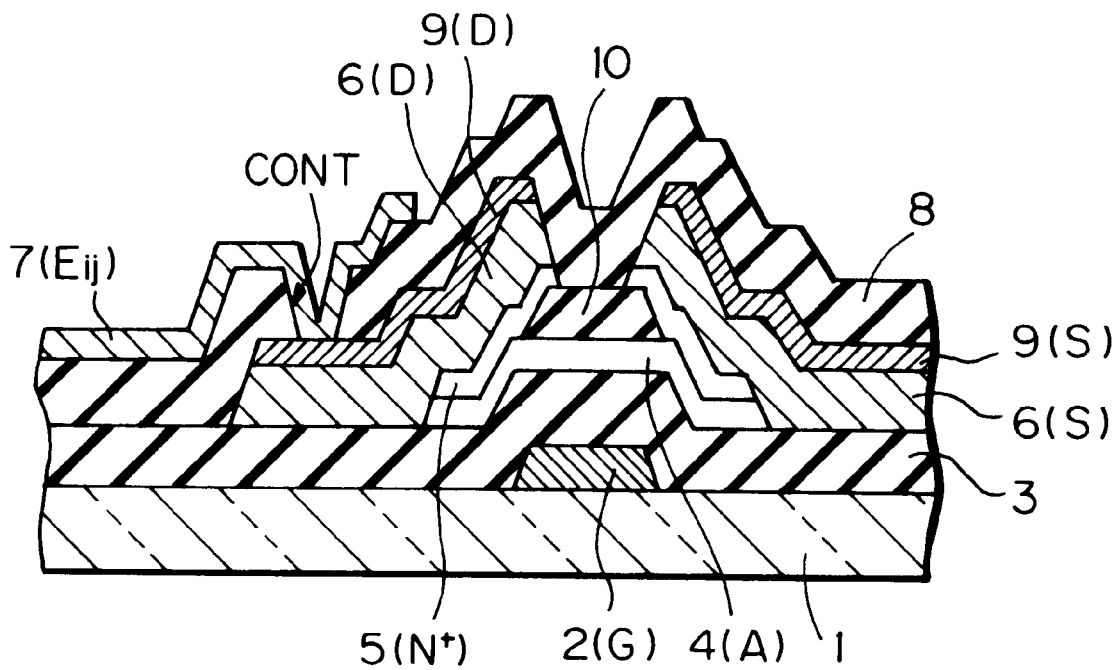
FIGS. 16 and 17 are cross-sectional views taken along the lines I—I and II—II, respectively, of FIG. 15.
Figure 17:
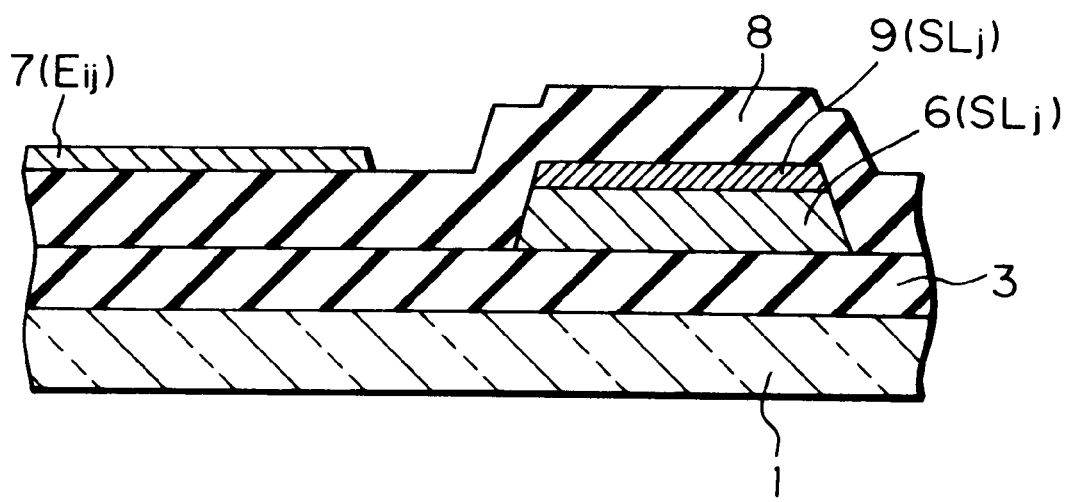

FIG. 15 is a plan view illustrating a second embodiment of the LCD apparatus according to the present invention, and FIGS. 16 and 17 are cross-sectional views taken along the lines I—I and II—II, respectively, of FIG. 15.

The above-described first embodiment relates to a channel-etching type thin film transistor; however, the second embodiment is applied to a channel-protection type thin film transistor. That is, an etching protection layer 10 made of silicon nitride is interposed between the amorphous silicon layer 4 and the $N^+$-type amorphous silicon layer 5 of FIG. 16, thus preventing the amorphous silicon layer 4 from being etched during the above-mentioned dry etching process for the $N^+$-type amorphous silicon layer 5.

The manufacturing steps of the apparatus of FIGS. 15, 16 and 17 are explained next with reference to FIGS. 18A through 18F.

Figure 18A:
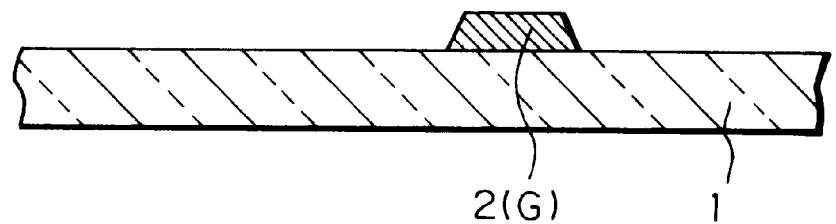
FIGS. 18A through 18G are cross-sectional views for explaining the manufacturing steps of the apparatus of FIG. 16.

First, referring to FIG. 18A, in the same way as in FIG. 14A, an about 100 to 300 nm thick conductive layer 2 made of Cr, Mo or Ta is deposited by a sputtering process on a glass substrate 1. Then, the conductive layer 2 is patterned by a photolithography process to form a gate electrode G and a gate bus line GLi (see FIG. 15).

Figure 18B:
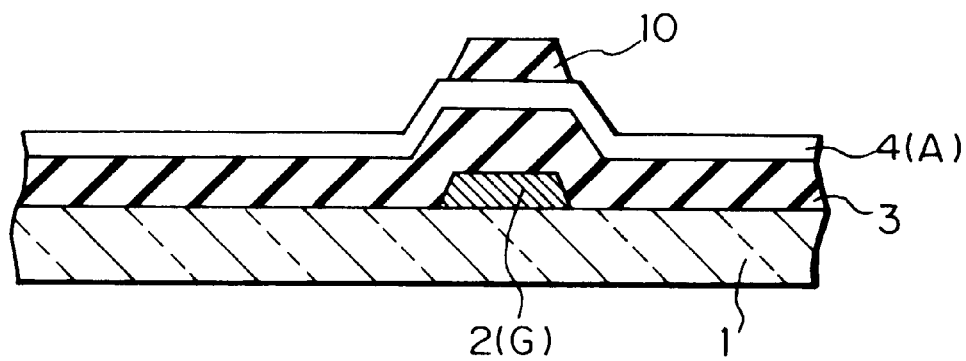

Next, referring to FIG. 18B, an about 200 to 600 nm thick gate insulating layer 3 made of silicon nitride is deposited by a plasma CVD process using silane and ammonia gas. Subsequently, an about 50 to 300 nm thick non-doped amorphous silicon layer 4 is deposited by a plasma CVD process using silane gas. Then, an etching-protection layer 10 made of about 30 to 100 nm thick silicon nitride is deposited by a plasma CVD process, and is patterned by a photolithography process.

Figure 18C:
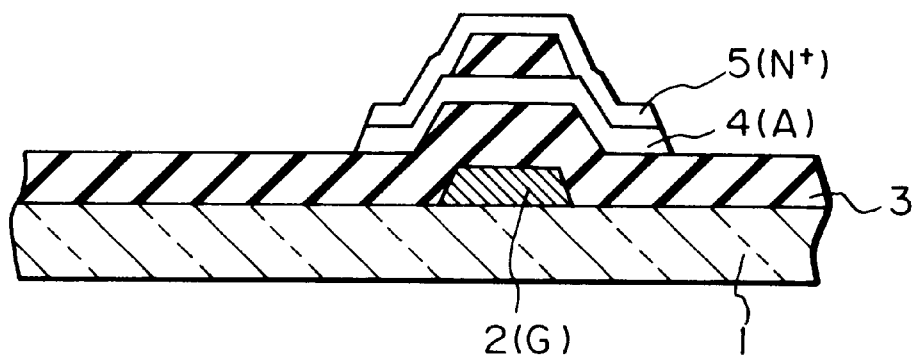

Next, referring to FIG. 18C, an about 30 to 100 nm thick $N^+$-type amorphous silicon layer 5 is deposited by a plasma CVD process using silane and phosphine gas. The $N^+$-type amorphous silicon layer 5 and the non-doped amorphous silicon layer 4 are patterned by a photolithography process, so that an island shape is formed.

Figure 18D:
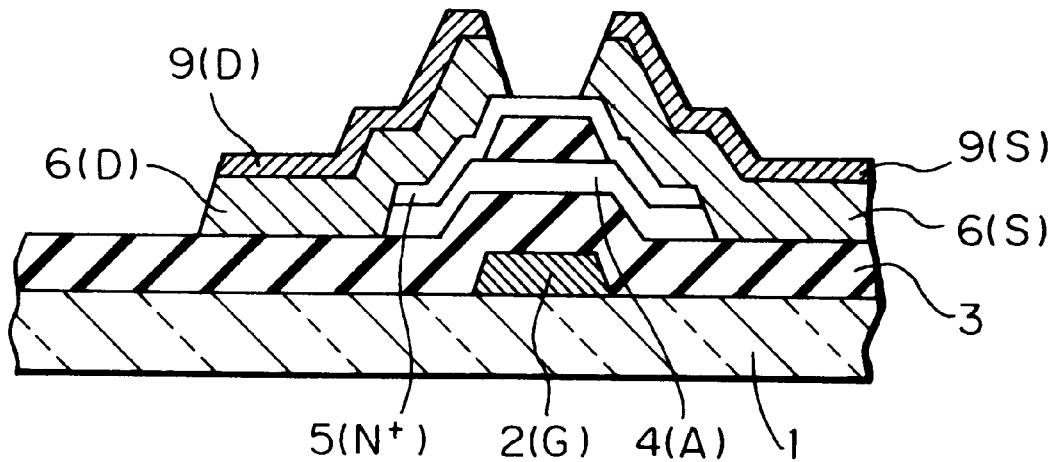

Next, referring to FIG. 18D, in the same way as in FIG. 14C, an about 100 to 300 nm thick conductive layer 6 made of Cr, Mo or Ta is deposited by a sputtering process, and subsequently, an about 10 to 100 nm thick conductive layer 9 made of ITO is deposited by a sputtering process. Then, the conductive layers 9 and 6 are patterned by a photolithography process to form a source electrode S, a drain electrode D and a source but line $SL_j$ (see FIG. 17).

Figure 18E:
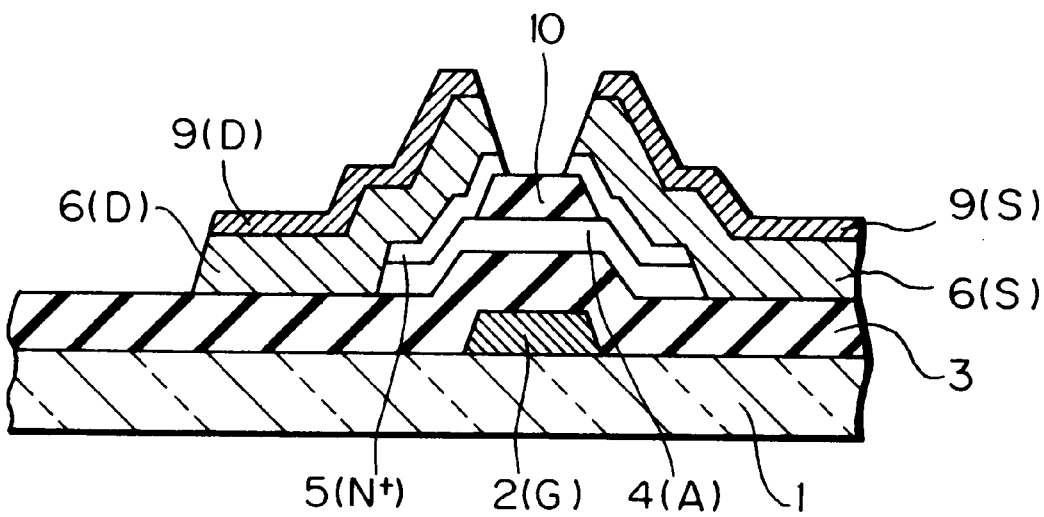

Next, referring to FIG. 18E, in the same way as in FIG. 14D, the $N^+$-type amorphous silicon layer 5 is etched by a dry etching process using the source electrode S and the drain electrode D as a mask, so that the source electrode S is electrically isolated from the drain electrode D. In this case, since the etching-protection layer 10 is present, the amorphous silicon layer 4 is never etched.

Figure 18F:
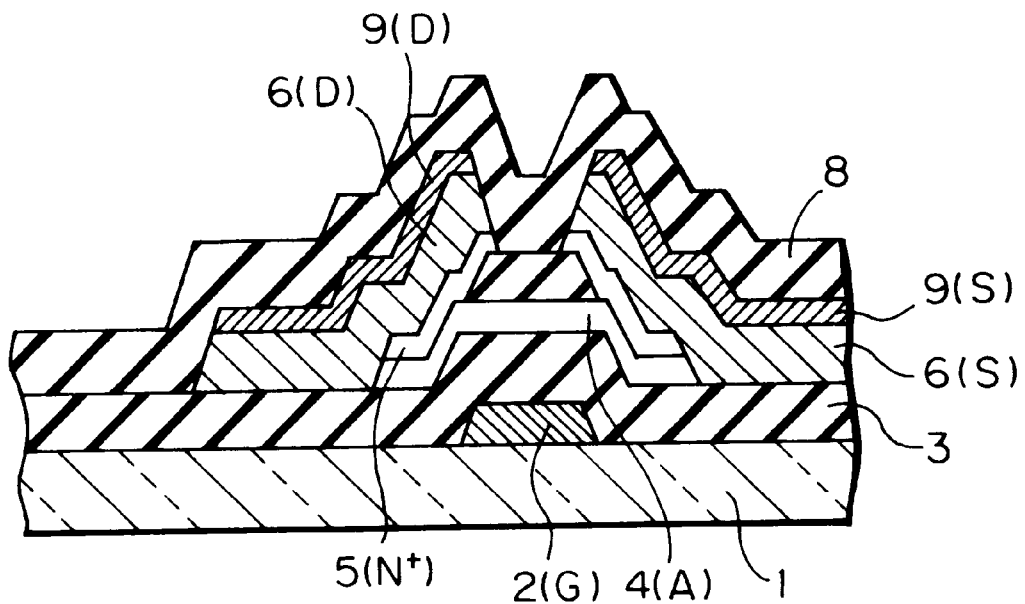

Next, referring to FIG. 18F, in the same way as in FIG. 14E, an about 200 to 400 nm thick insulating layer 8 made silicon nitride is deposited by a plasma CVD process. Note that the insulating layer 8 can be formed by coating and backing organic material such as polyimide.

Figure 18G:
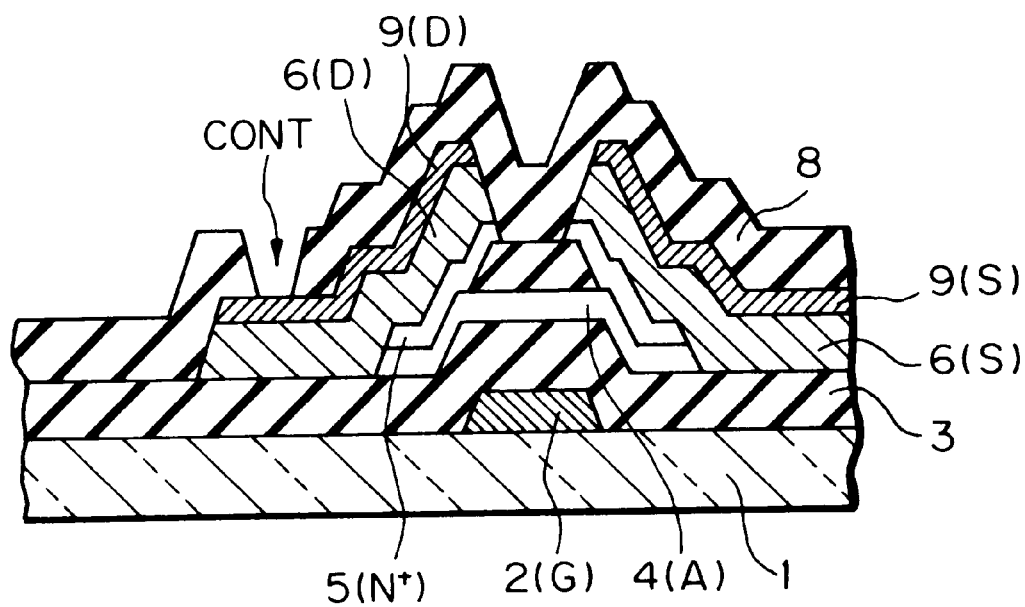

Next, referring to FIG. 18G, in the same way as in FIG. 14F, an 8 μm×8 μm contact hold CONT is perforated in the insulating layer 8 above the drain electrode D by a reactive ion (dry) etching process using $SF_6$ gas. Note that, if the insulating layer 8 is made of polyimide, the insulating layer 8 is etched by a reactive ion etching process using a mixture gas of $CF_4$ and $O_2$.

Finally, an about 10 to 100 nm thick ITO layer is deposited by a sputtering process, and is patterned by a photolithography process to form a transparent pixel electrode $E_{ij}$, as illustrated in FIG. 16.

In the second embodiment, the same effect of that of the first embodiment can be expected.

As explained hereinabove, according to the present invention, the resistance between the pixel electrode and the drain electrode can be stable and low, and also, the disconnection of the pixel electrode at the contact hole can be avoided.

I claim:

1. A liquid crystal display apparatus comprising:
   an insulating substrate;
   a gate electrode formed on said insulating layer;
   a gate insulating layer formed on said gate electrode;
   a semiconductor active layer formed on said gate insulating layer;
   a source electrode and a drain electrode formed on said semiconductor active layer, said source electrode and said drain electrode being of a double structure including a first conductive layer and a second conductive layer formed on said first conductive layer;
   an insulating layer formed on said source electrode and said drain electrode; and
   a pixel electrode formed on said insulating layer and being connected to said second conductive layer of said drain electrode via a contact hole perforated in said insulating layer, said pixel electrode being made of a same material as that of said second conductive layer.

2. The apparatus as set forth in claim 1, wherein said first conductive layer is made of metal, and said second conductive layer and said pixel electrode are made of indium tin oxide.

3. The apparatus as set forth in claim 2, wherein said metal includes at least one of Cr, Mo and Ta.

4. The apparatus as set forth in claim 1, wherein said semiconductor active layer comprises:
   a non-doped amorphous silicon layer; and
   first and second impurity-doped amorphous silicon layers formed on said non-doped amorphous silicon layer and being separated from each other, said first and second impurity-doped semiconductor layers being connected to said source electrode and said drain electrode, respectively.

5. The apparatus as set forth in claim 4, further comprising an etching-protection layer interposed between said non-doped amorphous silicon layer and said first and second impurity-doped amorphous silicon layer.

6. A method for manufacturing a liquid crystal display apparatus, comprising the steps of:
   forming a gate electrode on an insulating substrate;
   forming a gate insulating layer on said gate electrode;
   forming a semiconductor active layer on said gate insulating layer;
   forming a first conductive layer on said semiconductor active layer;
   forming a second conductive layer on said first conductive layer;
   patterning said first and second conductive layers to form a source electrode and a drain electrode;
   etching a part of said semiconductor active layer by using said source electrode and said drain electrode as a mask;
   forming an insulating layer on said source electrode and drain electrode;
   perforating a contact hole in said insulating layer, said contact hole exposing said drain electrode; and
   forming a pixel electrode on said insulating layer so that said pixel electrode is connected via said contact hole to said drain electrode, said pixel electrode being made of a same material as that of said second conductive layer.

7. The method as set forth in claim 5, wherein said first conductive layer is made of metal, and said second conductive layer and said pixel electrode are made of indium tin oxide.

8. The method as set forth in claim 7, wherein said metal includes at least one of Cr, Mo and Ta.

9. The method as set forth in claim 6, wherein said contact hole perforating step uses a dry etching process.

10. The method as set forth in claim 6, wherein said semiconductor active layer forming step comprises the steps of:
    forming a non-doped amorphous silicon layer; and
    forming an impurity-doped amorphous silicon layer on said non-doped amorphous silicon layer.

11. The method as set forth in claim 10, wherein said semiconductor active layer etching step etches said impurity-doped amorphous silicon layer.

12. The method as set forth in claim 10, further comprising a step of forming an etching-protection layer on said non-doped amorphous silicon layer,
    said semiconductor active layer etching step etching said impurity-doped semiconductor active layer on said etching-protection layer.

* * * * *